(12) United States Patent
Kiser (10) Patent No.: US 6,574,930 B2
(45) Date of Patent: Jun. 10, 2003

(54) PASSIVE FILM PROTECTION SYSTEM FOR WALLS

(75) Inventor: Michael D. Kiser, Pearland, TX (US)

(73) Assignee: Flame Seal Products, Inc., Houston, TX (US)

( * ) Notice: Subject to any disclaimer, the term of this patent is extended or adjusted under 35 U.S.C. 154(b) by 0 days.

(21) Appl. No.: 10/053,448

(22) Filed: Jan. 16, 2002

(65) Prior Publication Data

US 2002/0095908 A1 Jul. 25, 2002

Related U.S. Application Data (60) Provisional application No. 60/263,391, filed on Jan. 23, 2001.

(51) Int. Cl.[7] .............................. E04D 1/00; F16L 5/00
(52) U.S. Cl. ....................... 52/232; 52/220.8; 52/528; 52/748.1
(58) Field of Search .............. 52/220.8, 232, 52/748.1, 745.15, 528, 220.1, 742.1, 745.16

(56) References Cited

U.S. PATENT DOCUMENTS

| | | | | |
|---|---|---|---|---|
| 2,013,330 A | * | 9/1935 | Abraham | ...................... 52/521 |
| 3,422,589 A | * | 1/1969 | Harrison | ................... 52/309.15 |
| 4,018,962 A | * | 4/1977 | Pedlow | ........................ 442/138 |
| 4,086,736 A | * | 5/1978 | Landrigan | ................... 52/220.8 |
| 4,214,418 A | * | 7/1980 | Smith | .......................... 53/452 |
| 4,226,069 A | * | 10/1980 | Hinds | ........................... 52/521 |
| 5,065,553 A | * | 11/1991 | Magid | ........................... 52/58 |
| 5,091,243 A | * | 2/1992 | Tolbert et al. | ................ 442/60 |
| 5,103,609 A | * | 4/1992 | Thoreson et al. | ............. 52/232 |
| 5,421,127 A | * | 6/1995 | Stefely | ............................ 52/1 |
| 6,270,915 B1 | * | 8/2001 | Turpin et al. | ............... 428/703 |
| 6,477,813 B2 | * | 11/2002 | Andresen | ................... 52/220.8 |

FOREIGN PATENT DOCUMENTS

DE          4017656 A1  * 12/1991  ............. F16L/5/02

* cited by examiner

Primary Examiner—Carl D. Friedman
Assistant Examiner—Brian E. Glessner
(74) Attorney, Agent, or Firm—Elizabeth R. Hall (57) ABSTRACT

A passive fire protection system for the protection of vertical walls against flames and heat in a severe total environment type fire, the system including a multi-layered, flexible material containing at least one layer of intumescent material. This multi-layered material is configured such that it provides a containment system for the carbonaceous foam resulting from the expansion of the intumescent. The system further includes an installation process whereby the attachment of this multi-layered material to vertical surfaces is protected from the extreme heat of a fire.

17 Claims, 8 Drawing Sheets

PASSIVE FILM PROTECTION SYSTEM FOR WALLS

CROSS-REFERENCE TO RELATED APPLICATION

The present application claims the benefit of 35 U.S.C. 111(b) Provisional application Serial No. 60/263,391 filed Jan. 23, 2001 and entitled Passive Fire Protection for Walls.

BACKGROUND OF THE INVENTION

1. Field of the Invention

The present invention generally relates to a fire protection system for vertical surfaces and in particular to a fire protection system for walls, wherein the system is stable in an environment of extreme heat and flames to provide long lasting fire protection to vertical surfaces.

2. Description of the Background Art

There are three major types of materials that have been used to protect walls and flat surfaces from excessive heat and flame to retard both the damage caused by the fire and the spreading of the fire. These three types of material are: (1) insulative materials, (2) endothermic materials, and (3) intumescent coatings and materials.

The use of insulative materials such as alumina silica blankets and boards, or mineral wool blankets and boards are problematic because the materials are typically very thick and/or heavy. These materials are bulky and difficult to install. In addition, insulative materials can become detached from vertical surfaces when the heat of a fire expands or destroys the means by which the insulative materials are attached to the walls.

Endothermic materials are composed of compounds that activate in a fire situation by breaking down at the molecular level and releasing trapped water which then cools the protected item. The most common example of this is alumina tri-hydrate, which is a dry white powder that releases large amounts of water at about 1,100° F. A well-known endothermic product is the INTERAM™ E-50series flexible wrap systems available from 3M Fire Protection Products, St. Paul, Minn. The thickness problem inherent in insulation systems is somewhat lessened, but endothermics have their own problems. Due to the fact that the material has water molecules trapped in dry form, the system tends to be quite heavy. Furthermore, there is no successful method suggested for installing such materials on a vertical surface. When the 3M INTERAM™ E-50 system is installed on electrical conduits or cable trays, it is installed in several layers with careful sealing at all seams to hold in the water that will be released in a fire. Thus, the INTERAM™ E-50 system is difficult to install and had high associated labor costs. Also, once installed, these systems are extremely difficult to remove and replace in order to do maintenance work or to update electrical and communication networks buried within a wall.

Intumescent materials are products that "grow" or "thicken" only when exposed to heat, creating an insulation layer that separates the protected item from the fire. One major advantage of intumescent materials is that the unreacted material is thin and lightweight. Intumescent materials are also easier to install. In fact, intumescent materials are often applied as a lightweight coating over the area to be protected. Yet there are two severe problems with spray-on intumescent coatings.

(1) The carbonaceous "foam" that results when the intumescent materials expand upon exposure to heat is always fragile and is generally damaged by the turbulence of a fire. In addition, expanded intumescent materials will fall off of the coated surfaces due to the pull of gravity. This fragile nature of intumescent materials leads to the formation of "fissures" in the material which allow heat to penetrate to the protected surfaces. These fissures appear randomly and give the system a quality of unpredictability that is undesirable for fire protection systems.

(2) Furthermore, when expanded intumescent materials are exposed to direct fire and heat, the outer carbonaceous foam that is in direct contact with the fire tends to erode, thus exposing lower layers of the materials. The lower layers also erode, causing a geometric reduction of the effectiveness of the product over time. This eroding effect accelerates the growth of the above mentioned fissures and magnifies the unpredictability of the system.

U.S. Pat. No. 5,681,640 describes a multi-layered, flexible material containing a plurality of layers of intumescent materials that provides one solution to containment of the carbonaceous foam. The multi-layered materials contain folds that expand with the expansion of the intumescent materials and stabilize the carbonaceous foam resulting from the expansion of the intumescent materials. However, the described fire protection system is designed to protect conduit, cable trays, support rods, and structural steel. The material is made to wrap around a protected area with the ends of the wrap being fastened together. There is no hint of how one might apply the described material to a wall in a way that would protect the wall anchor from the extreme heat of a fire.

Gravity works to pull down any fire protective system applied to large vertical surfaces such as walls. Under normal conditions, attaching the fire protective system to a wall with adhesives, nails or screws can defeat gravity. However, as a fire begins and temperatures rise above 500° or 1000° F. adhesives melt and metal components such as nails and screws expand. As fastening components expand, they become longer and loosen their grip on the fire protection system thereby allowing it to be pulled off the wall by the weight of the system.

Accordingly, a need exists for a fire protective system that can take advantage of the favorable qualities of intumescent materials to protect large vertical surfaces, such as walls. A further need exists for stabilizing the expanded carbonaceous foam of activated intumescents applied to large vertical surfaces against the pull of gravity. A fire protective system is needed that can be installed on walls that will remain in place during the extreme heat generated during a fire.

SUMMARY OF THE INVENTION

The present invention includes a passive fire protection system for the protection of vertical walls against flames and heat in a severe total environment type fire. The system includes a multi-layered, flexible material containing at least one layer of intumescent material. This multi-layered material is configured such that it provides a containment system for the carbonaceous foam resulting from the expansion of the intumescent. The protective sheets include a set of protective sheets having a J-fold on a first side, the J-fold formed by the inward folding of a side of the sheets; a set of protective sheets having a Z-fold at a bottom end, the Z-fold having a first fold upward and a second fold downward; and a set of sheets having a top-fold at a top end, the top-fold formed by the downward folding of a top side of the sheets. The fire protective system also includes mounting bars and wall anchors for attaching the protective sheets to the wall, strips of fire protective material for underlaying seams of adjoining protective sheets, fasteners for securing adjoining pieces of protective sheets to form a seam; and fire resistant adhesive tape.

In accordance with another aspect of the invention, a fire protection system for walls comprises: (a) multi-layered flexible protective sheets containing at least one layer of an intumescent; (b) mounting bars and wall anchors for attaching the protective sheets to a wall, the mounting bars and wall anchors being protected from intense heat by the protective sheets; (c) fasteners for securing adjoining pieces of protective sheets to form a seam; and (d) fire resistant adhesive tape used to hold seams and folded protective sheets into place.

Yet another aspect of the invention is an installation process whereby the attachment of the multi-layered protective sheets to vertical surfaces is protected from the extreme heat of a fire. The installation process includes:

(a) installing the protective sheets having a Z-fold along a bottom section of the wall adjoining a floor, the first fold being attached to the wall with a first mounting bar and a first wall anchor, and the second fold secured to the wall with a nail or screw, wherein the second fold covers the first mounting bar and the first wall anchor used to attach the first fold to the wall;

(b) installing protective sheets vertically up the wall by mounting a pair of protective sheets to the wall with a second mounting bar and a second wall anchor, flipping the top protective sheet over the second mounting bar and the second wall anchor to cover the second mounting bar and the second wall anchor;

(c) installing the protective sheets having a top-fold to a top section of the wall adjoining the ceiling by securing the top end of the top-folded protective sheets to the top section of the wall, wherein the top-fold is folded over a third mounting bar and a third wall anchor and secured to the surface of the protective sheet with a fire resistant adhesive tape;

(d) connecting adjacent protective sheets having a J-fold, wherein a strip of a fire protective material is secured to the wall under an overlapping area comprising the J-fold of one protective sheet and a section of one side of another protective sheet, the overlapping area being secured together with a plurality of fasteners to form a seam, wherein the seam is folded flat and taped down with a fire resistant adhesive tape; and (e) repeating steps (a) through (d) as needed to cover the surface of the wall.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiments disclosed might be readily utilized as a basis for modifying or designing other structures for carrying out the same purpose of the present invention. It should also be realized by those skilled in the art that such equivalent constructions do not depart from the spirit and scope of the invention as set forth in the appended claims.

BRIEF DESCRIPTION OF THE DRAWINGS

The accompanying drawings, which are incorporated in and form a part of the specification, illustrate the embodiments of the present invention, and with the description, serve to explain the principles of the invention. In the drawings.

DETAILED DESCRIPTION OF PREFERRED EMBODIMENTS

The present invention relates to the design and installation of a passive fire protection system for the protection of large vertical surfaces such as walls and protrusions therefrom.

Figure 1A:
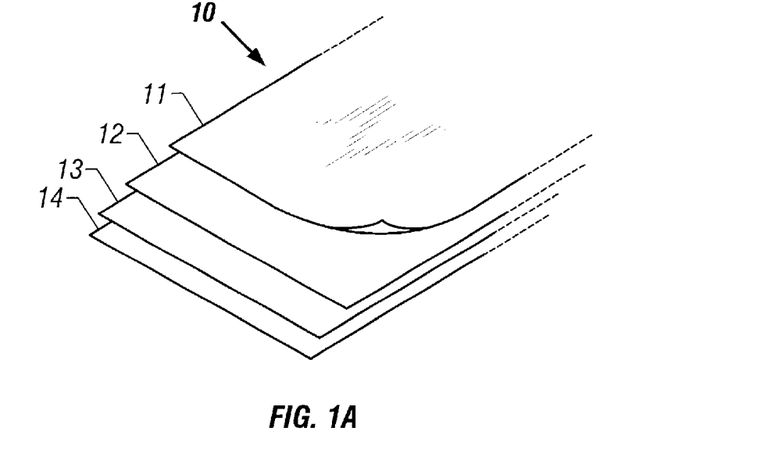
FIG. 1A is an exploded view of the component layers of heat resistant materials in one embodiment of a fire protective sheet.
Figure 1B:
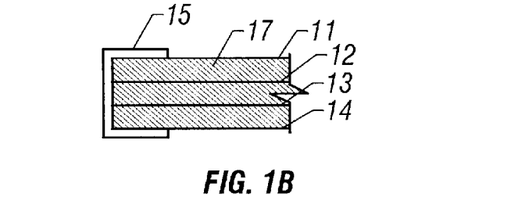
FIG. 1B is a cross-section of one end of one embodiment of a protective sheet.

Referring now to the drawings, and initially to FIGS. 1A and 1B, it is emphasized that the Figures, or drawings, are not intended to be to scale. For example, purely for the sake of greater clarity in the drawings, layer thicknesses and spacings are not dimensioned as they actually exist in the assembled embodiments.

The fire protective sheet 10 of the present invention is a multi-layered, flexible material containing at least one layer of intumescent material. The fire protective sheet 10 will preferably contain from 2–5 layers of heat resistant materials. An exploded view of several layers is seen in FIG. 1A. The component layers of the fire protection system 10 may be composed of the same fire resistant materials or different heat resistant materials. Interspersed between the layers of fire-resistant materials is an intumescent 17 that will expand during a fire.

Although any flame resistant material can be used in the present invention, preferred embodiments will include metal foils, fire-resistant fabrics, or a combination of materials such as aluminum foil, stainless steel foil, fiberglass, or alumina silica fabric. In a preferred embodiment illustrated in FIG. 1A, fire-resistant layer 11 is made of a thin sheet of stainless steel (such as a 0.002 or 0.003 gauge foil), layer 12 is made of a fiberglass material, layer 13 is made of ceramic wool, and layer 14 is made of a thin aluminum foil (such as a 0.002 or 0.003 gauge foil). As shown in FIG. 1B, the layers are held together by adhesive fire 11 resistant material 15, such as an industrial aluminum or stainless steel tape folded over the top and bottom layers and running along the length of the edges of the fire protective sheet 10. Although the fire protective sheet can be any size and shape, sheets that are 52 inches long, 24 inches wide, and 3/16 inches thick are very useful for wall coverings.

Examples of preferred intumescent materials that can be used to hold the layered materials together are 3M's CP-25™ intumescent caulking material that can be obtained from 3M Fire Protection Products, St. Paul, Minn., or a FX-100® coating material available from Flame Seal Products, Inc., Houston, Tex. The greater the expansion capacity of the intumescent materials utilized in the invention the greater the fire protective ability of the sheet 10. Preferred intumescent materials will have an expansion capacity of 700% or more. However, materials having lesser degrees of expansion may suffice in certain applications depending on the quantity of intumescent used between the layers and the number of layers used.

The reaction temperature of most intumescent products is 350° F. to 500° F. As long as there is any unreacted intumescent in the fire protective sheet 10, the materials below the reacting intumescent will not reach an ignition temperature. Furthermore, as the intumescent material expands and forms a carbonaceous foam, its increased thickness serves to insulate the material beneath it.

The fire protective sheet 10 is used to inhibit the spread of flames and insulate the heat from the flammable structural components of a building or room. The judicious use of such fire protective sheets provides a person or business a longer time to respond with efficacy to a fire problem.

Gravity works to pull down any fire protective system applied to vertical surfaces. Under normal conditions, gravity can be defeated by attaching the fire protective system to a wall with adhesives, nails or screws. However, as a fire begins and temperatures rise adhesives melt and metal components such as nails and screws lengthen and will be quickly pulled out of the wall with the weight of the fire protective system. This problem is addressed by the present invention by installing the fire protective sheets in a manner that protects the wall anchor used to attach the fire protective sheets to a wall from extreme heat.

Figure 2:
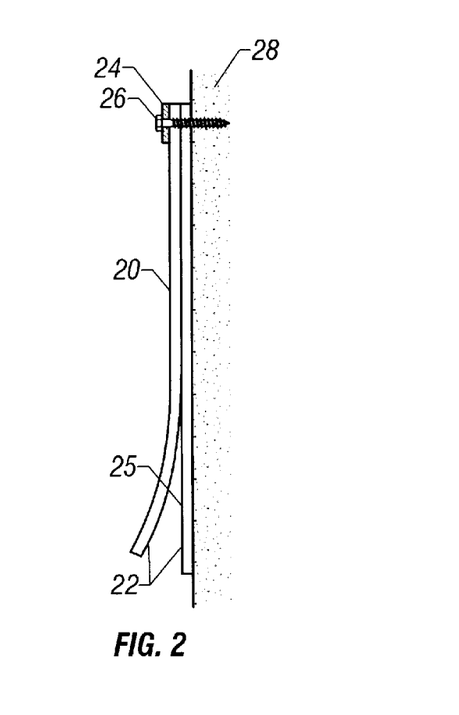
FIG. 2 is a side view of two protective sheets attached to a wall.
Figure 3A:
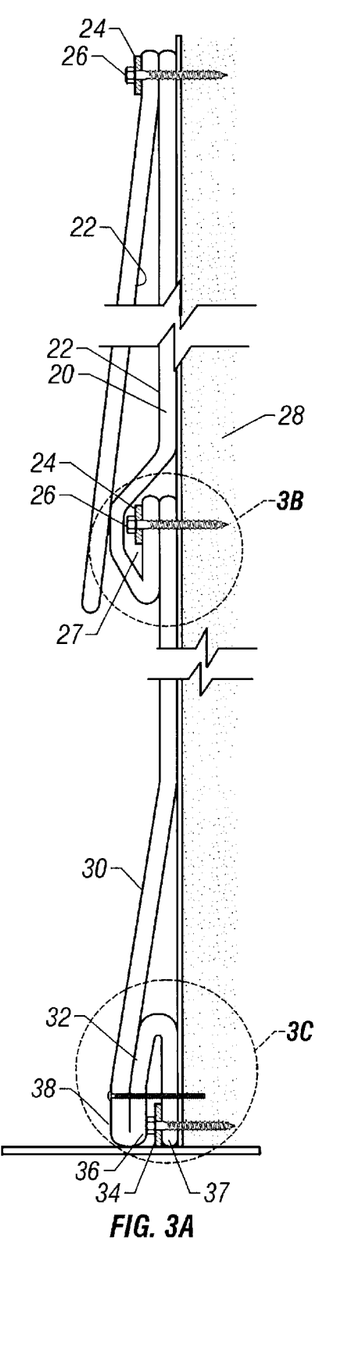
FIG. 3A is a side view of three protective sheets attached to a wall.
Figure 3B:
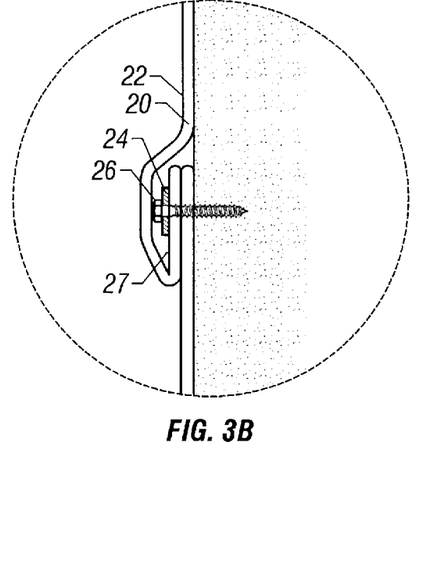
FIG. 3B is a close-up view of two sheets mounted on a wall, where the top sheet is folded over the mounting bar and attachment means to protect them.
Figure 3C:
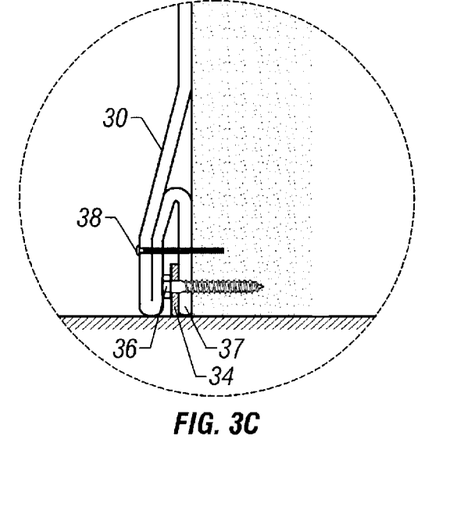
FIG. 3C is a close-up view of a Z-fold where a protective sheet adjoins the floor.

FIGS. 2 and 3 illustrate one aspect of the installation of fire protective sheets 10. A first fire protective sheet 20 and a second fire protective sheet 25 are mounted on a wall with a mounting bar 24 and a wall anchor 26, where the wall anchor 26 transverses the mounting bar 24, the two sheets 20 and 25 and enters the wall 28. Preferably, the mounting system comprises a 17 inch long, ¾ inch wide and ⅛ inch thick steel bar as the mounting bar and 1.5 inch long sheet metal screws as wall anchors for securing the protective sheets to the wall 28. Typically, the wall anchors will be inserted on 5 inch centers, through pre-drilled ¼ inch holes.

The two sheets 20 and 25 are mounted with the top layer 22 of the sheets, or the surface to be exposed to the environment, facing each other. Typically, this exposed surface 22 is a 0.002 gauge stainless steel foil. Once attached to the wall, the first protective sheet 20 is folded over the mounting bar 24 and screw 26. The result can be seen in more detail in FIGS. 3A and B. Once sheet 20 has been folded over the mounting bar 24 and the screw 26, sheet 20 will protect them from the heat of a fire. As seen in FIG. 3B, there is an area of slack 27 at the end of the sheet 20 where it is folded over. The slack area 27 allows the intumescent materials in the protective sheet 20 to expand as sheet 20 is heated during a fire.

The protective sheet 30 which touches the floor on its bottom end 37, as shown in FIGS. 3A and C, is installed in a particular manner in order to protect the mounting bar holding it into place right above the floor. Protective sheet 30 is attached to the wall 28 at a height to ensure that a certain portion of the length (preferably about 4 inches) of protective sheet 30 is available to make a Z-fold 32. Once the Z-fold 32 is made, the bottom end 37 of protective sheet 30 touches the floor and is secured to the wall 28 with a mounting bracket 34 and a screw 36. The top portion of the Z-fold 32 of protective sheet 30 is then attached to the wall 28 through the Z-fold 32 with another screw 38. Thus, even as screw 38 expands in the heat so does the intumescent material 17 within the protective sheet 30 thereby protecting the mounting bar 34 and the screw 36. Furthermore, since the Z-fold 32 rests on the floor gravity does not have the same pulling down effect that it does at the top of protective sheet 30.

Figure 4:
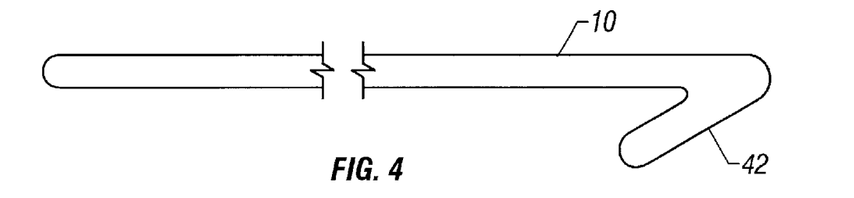
FIG. 4 is a cross-sectional view of one end of a protective sheet having a J-fold.

The protective sheets are also connected laterally. Although not shown in FIGS. 1 and 2, each protective sheet 10 has one side that is folded over in a J configuration toward the exposed surface of that protective sheet as illustrated in FIG. 4. This J-fold 42 is always placed on the same side (e.g., the right side) as each sheet is put into place.

Figure 5:
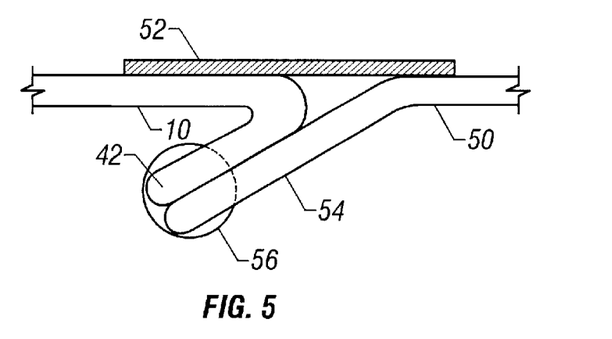
FIG. 5 is a top view of the fire protection system where two protective sheet are adjoined.
Figure 6A:
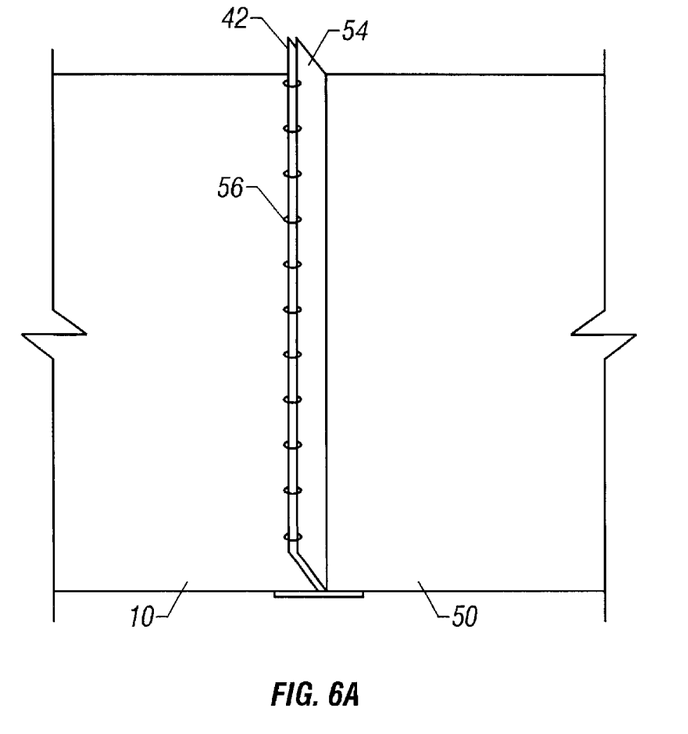
FIG. 6A is a pan view of the seam formed by two adjoining protective sheets.
Figure 6B:
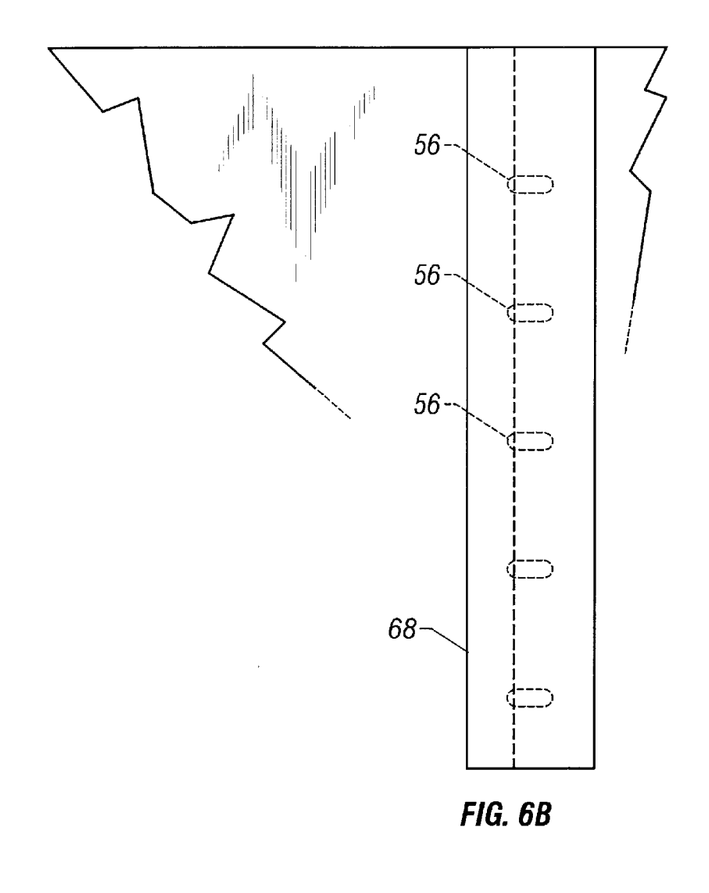
FIG. 6B shows a seam that is folded over and taped down.

FIGS. 5, 6A and 6B illustrate the lateral installation of the wall coverings. As shown in FIG. 5, a strip 52 of fire protective material, such as a ½ inch thick ceramic wool, is placed under all J-folds of the wall coverings. The strips 52 are wide enough to underlie the J-fold 42 of one protective sheet and an overlap portion 54 of an adjoining sheet 50. Once the strips 52 are in place, the J-fold 42 of one sheet is joined to the overlap portion 54 of an adjoining sheet 50 with a fastener 56. Any suitable fastener will work but stainless steel hog rings are preferred fasteners. Typically, fasteners 56 are placed every ½ to one inch along the length of the adjoining edges of sheet 50 and J-fold 42 as shown in FIG. 6A. Once the J-fold 42 of one sheet has been secured with fasteners to an overlap portion 54 of another protective sheet, the seam is folded over and secured on one side with a fire resistant adhesive material 68 such as industrial aluminum or stainless steel tape as shown in FIG. 6B.

Figure 7:
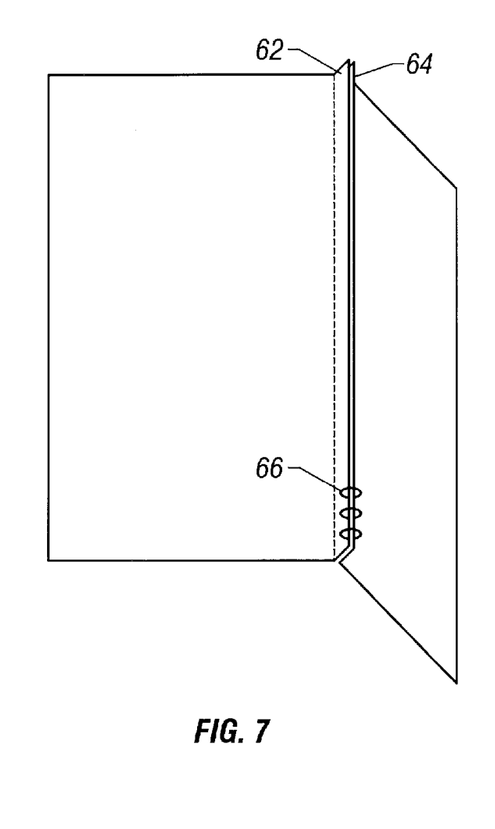
FIG. 7 illustrates the adjoining of two protective sheets to protect a corner.

The process described above for installing lateral wall coverings is very similar to the process used to install protective sheets at corners of a room. All corners, whether inside or outside in configuration must have a protected vertical seam. First, as described above, a small strip of a protective sheet, a ½ inch thick ceramic wool or some other fire resistant material, is taped into the center of the corner. A fold-over section 62 and 64 from the protective sheets entering the corner from both sides are placed into the corner. This foldover section may be a J-fold or it may be an overlap portion such as illustrated in FIG. 6. Once the fold-over sections 62 and 64 are in place, the two fold-over sections are joined together with fasteners 66. Any suitable fasteners will work but stainless steel hog rings are preferred fasteners. Typically, fasteners 66 are placed every ½ to one inch along the length of the adjoining fold-over sections 62 and 64. Once the seam between the adjoining protective sheets has been secured with fasteners, the seam is folded over and secured on one side with a fire resistant adhesive material such as industrial aluminum or stainless steel tape similar to the process shown in FIG. 6B.

Figure 8A:
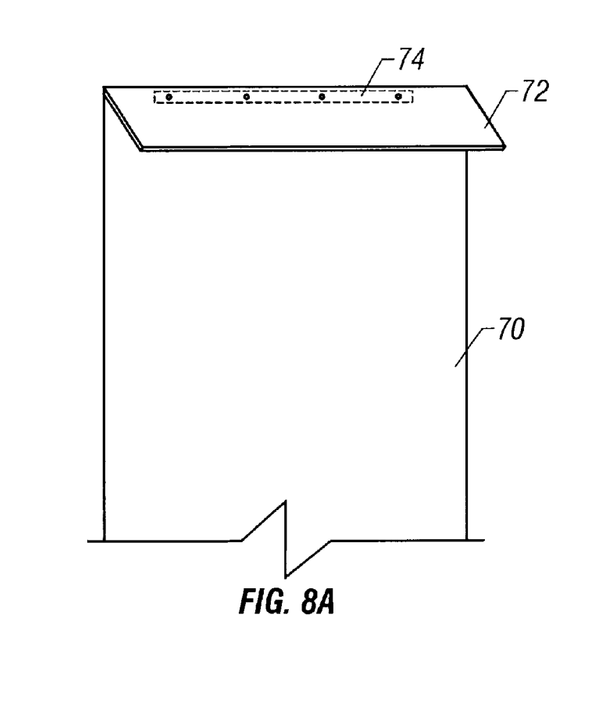
FIG. 8A is a pan view of a protective sheet as mounted next to a ceiling.
Figure 8B:
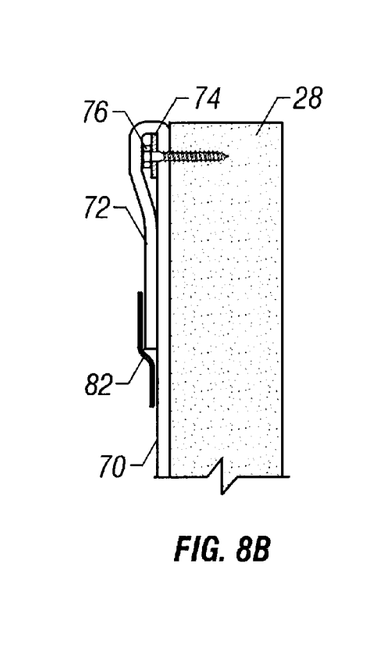
FIG. 8B is a cross-sectional view of an installed protective sheet abutting the ceiling.

FIGS. 8A and 8B illustrate the installation of protective sheets where they adjoin a ceiling 78. In FIG. 8A, protective sheet 70 is attached to the wall 28 close to the ceiling with the mounting bar 74 and screw 76. A top section of sheet 70 is bent back to form a top-fold 72 over the mounting bar 74 and screw 76. Once top-fold 72 is bent into place and the area of protective sheet 70 under top-fold 72 is secured to the wall 28, then top-fold 72 is secured in its bent over position with a fire resistant adhesive material 82 such as industrial aluminum or stainless steel tape as illustrated in FIG. 8B. The fire resistant adhesive material 82 will hold the bent top-fold 72 in place until the intumescent begins to expand. As the intumescent expands in top-fold 72, gravity pulls top-fold 72 towards the floor, thereby continuing to protect mounting bar 74 and screw 76.

Protective sheets installed to adjoin a termination of a wall, such as at a door, are mounted similarly to protective sheets adjoining a ceiling described above. In this case, the vertical side of the protective sheet adjoining the termination is attached to the wall with mounting bars and wall anchors. A section of the protective sheet, preferably at least 2 inches, is left unattached on the far side of the mounting bars. This extra material is provided so that it can be bent back over the mounting bars and screws or nails or other wall anchors, similar to the method illustrated in FIGS. 8A and 8B for a protective sheet adjoining a ceiling. The material that is bent back over the mounting bar is taped into place with a fire resistant adhesive tape. As the temperature rises, the intumescent expands in the protective sheet and the bent back section around the mounting bars and screws or nails holding the protective sheet up. The expanded intumescent will insulate and protect the screws or nails while allowing them to continue to hold up the protective sheets.

One advantage of the present invention is that even after the outermost layer of intumescent has expanded and the first layer of fire resistant material has deteriorated due to the heat, then the second layer begins to expand and protect the lower layers from the heat. Since the nails or screws attaching the protective sheets to the wall transverse all layers of the protective sheet, the portion of the screws or nails attaching the protective sheet to the wall continues to be protected from the heat.

FIGS. 9 and 10A–D illustrate the installation of a fire protective sheet around wall penetrations such as an electrical box or conduit. All wall penetrations are preferably covered before the installation of the main protective system on the wall. Once penetrations are covered, protective sheets are installed as described above with pre-cut holes through the protective sheets in substantially the same shape and size of the penetrating item so that the seams can be easily covered with adhesive fire resistant tape.

Figure 9:
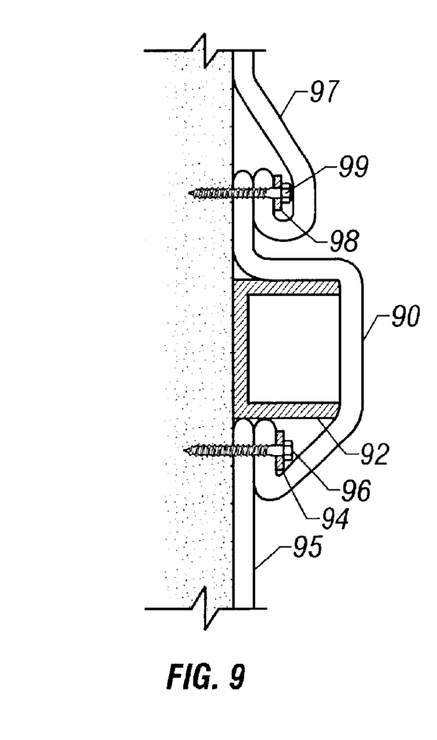
FIG. 9 is a cross-sectional view of one embodiment of the installation of protective sheets around a rectangular penetration protruding from the wall.

FIG. 9 illustrates the covering of a square or rectangular wall penetration such as an electrical box. A small strip 90 of a protective sheet is attached to the wall over the end of protective sheet 95. Strip 90 and protective sheet 95 are attached to the wall with a mounting device 94 and wall anchor 96, such as a nail or screw. Strip 90 is folded over the mounting device 94 and wall anchor 96 to protect them from extreme heat. The other side of strip 90 is attached to the wall in a similar manner with protective sheet 97. Protective sheet 97 is then folded over the mounting device 98 and wall anchor 99. This configuration protects the penetration from extreme heat.

Other penetrations such as pipes or conduits may be protected as shown in FIGS. 10A–10D. The penetrating pipe 100 is covered a short distance from the wall, preferably about 18 inches out from the wall. A strip 110 of protective sheet is prepared that is about 20 inches wide and approximately 2 inches longer than the circumference of the penetrating pipe 100.

Figure 10A:
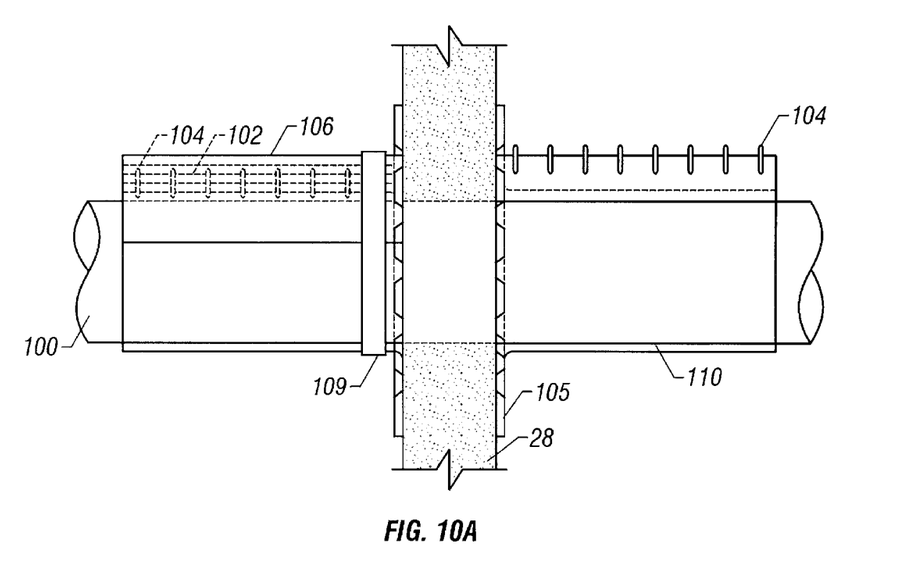
FIG. 10A is a cross-sectional view of one embodiment of the fire protection system installed around a pipe protruding through a wall.
Figure 10B:
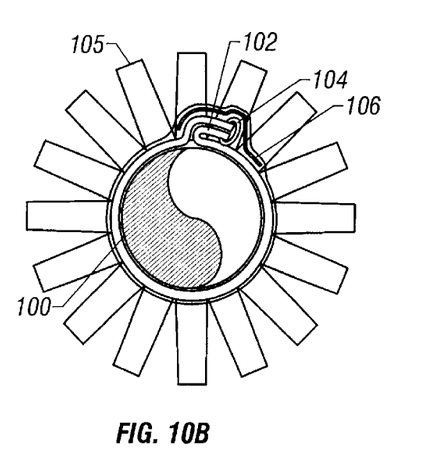
FIG. 10B is an end view of a protective sheet wrapped around a pipe.

A small section, preferably about 2 inches, at one end of strip 110 is cut at intervals to form a series of flares 105 along its width as shown in FIG. 10B. The strip 110 of material is then wrapped around the penetrating pipe 100. The flares 105 are taped to the adjoining wall with a fire resistant adhesive tape. Since the length of the strip 110 is longer than the diameter of the penetrating pipe 100, the extra inches in length are used to form a seam 102 similar to the seams formed between adjoining wall sheets. The seam 102 is secured with fasteners 104 placed about every ½ inch along the seam. Preferably such fasteners are stainless steel hog rings. After being secured, the seam is folded down and taped in place with fire resistant adhesive tape 106, such as aluminum tape. One or more optional ½ inch stainless steel bands, or other fasteners 109, may be used to further secure the protective sheet 110 along the pipe 100.

Figure 10C:
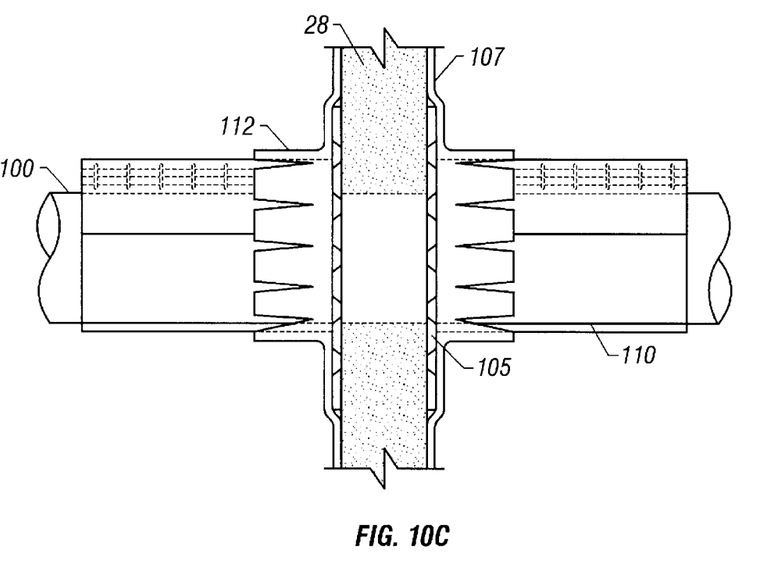
FIG. 10C is a cross-sectional view of the installation of a precut protective sheet over a wrapped pipe protruding from a wall.
Figure 10D:
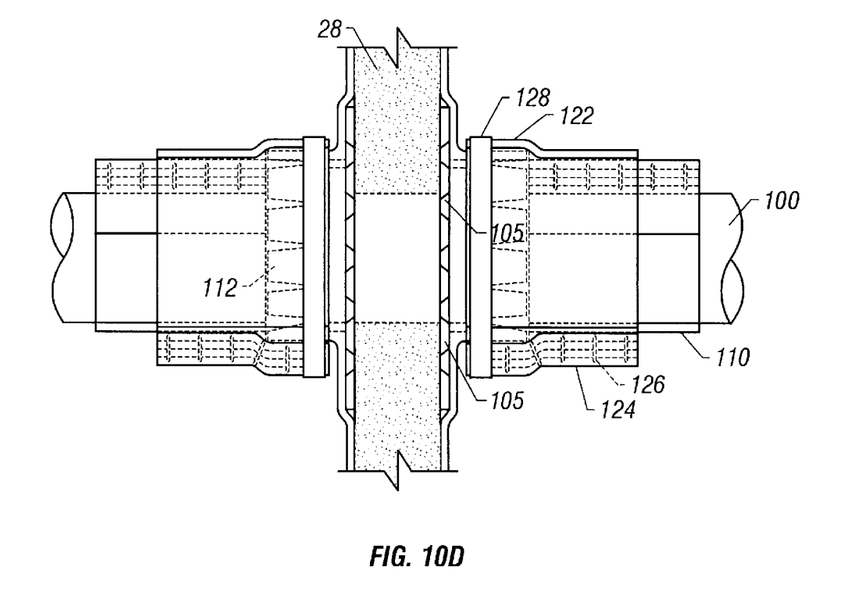
FIG. 10D is a cross-sectional view of a collar installed over the flared ends of fire protective sheets wrapped around a pipe protruding from a wall.

FIG. 10C shows the protective sheet 107 pre-cut with a hole having a radius approximately 2 inches shorter than the radius of pipe 100. The circumference of this precut hole is cut at intervals to form a series of flares 112. The flares 112 are flared over the strip 110. Finally, another strip of a protective sheet (shown in FIG. 10D) is installed over the flared ends 105 and 112 as a collar 122. Overlapping ends of the collar 122 are secured with fasteners 126 to form a seam 124 that is folded down and secured with a fire resistant adhesive tape. One or more optional ½ inch stainless steel bands, or other fasteners 128, may be used to further secure the collar 122 around the flares 105 and 112.

In the presence of the intense heat generated by a fire the intumescent material of the protective strips will expand both vertically and horizontally. The expansion of these materials will further insure the protection of protected areas under seams and joints of adjoining protective sheets. The fire protection system allows for free expansion in all directions. Expansion in the vertical direction is due to the "slack" created by the extra material around the horizontal mounting bars and expansion in the horizontal direction can occur in the J-fold, where the material is folded over on one side of each vertical joint.

EXAMPLE 1

The fire protective effectiveness of the described fire protection system has been tested. Fire protective sheets were installed on a foam core wall and placed in a large furnace at Omega Point Laboratories, San Antonio, Tex. A series of 10 thermocouples were spread about the furnace to provide an accurate reading of the furnace temperature. A series of 11 thermocouples were placed at various positions between the fire protective sheets and the foam core wall to be protected. The laboratory ambient temperature at the onset of the test was 89° F. and the relative humidity was 42%. The fire burners were ignited and programmed to follow the 119-98 time/temperature curve for 120 minutes. The 119-98 time/temperature curve is a standard heat curve calculated to mimic heat increases seen in real fires.

Figure 11:
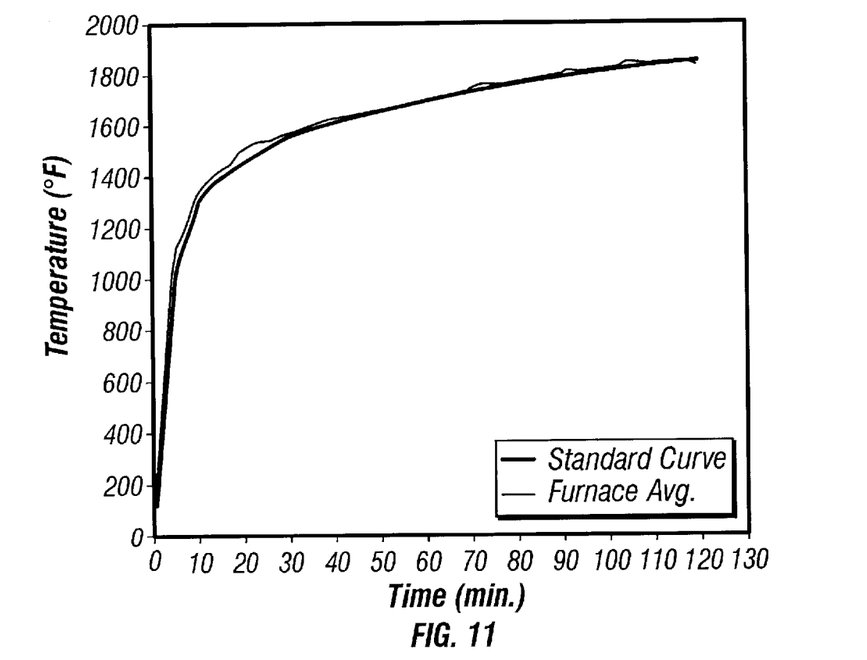
FIG. 11 is a graph illustrating the calculated standard of rise in temperature with time of a fire and the rise in temperature in the test furnace with time.
Figure 12:
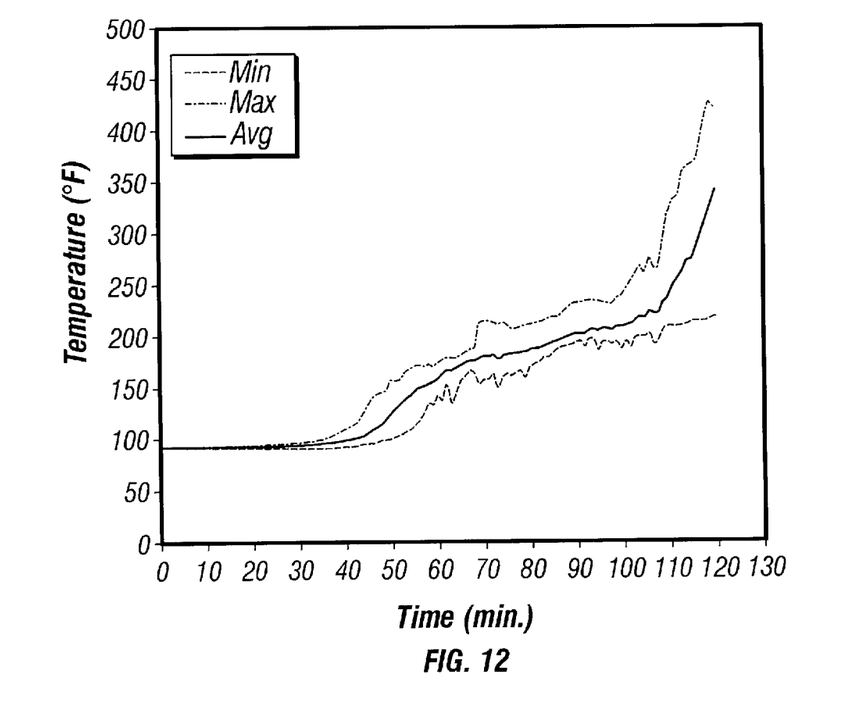
FIG. 12 is a graphical illustration of the maximum temperature, the minimum temperature and the average temperature of 11 thermocouples on the cold side of a protective sheet subjected to the furnace temperatures shown in FIG. 11.

FIG. 11 shows the standard calculated heat curve (i.e., the 119-98 time/temperature curve) and the actual average temperature measured by the 10 thermocouples placed throughout the furnace. The actual furnace temperature closely followed the calculated standard curve. FIG. 12 illustrates the temperature measurements of the 11 thermostats on the backside or "cold side" of the protective sheets throughout the 120 minutes of testing. FIG. 12 gives the minimum temperature, the maximum temperature, and the average temperature of the 11 thermocouples. The temperatures were recorded once a minute throughout the 120 minutes of testing. After 118 minutes of fire exposure, a thermocouple on the cold side of the fire protective sheet exceeded the maximum allowable temperature of 414° F.

The results of this test show that the fire protective system described herein can meet the conditions of acceptance as outlined in the ASTM E119-98 Fire Tests of Building Construction and Materials for a fire endurance rating of 118 minutes. Thus, the described fire protection system can protect a wall from becoming inflamed for up to two hours. During a fire, the time occupants of the room and building have to escape from danger is crucial to the safety/survival of those people on site. Furthermore, the fire protection system allows fire fighters to react to a localized fire rather than a globalized fire due to uncontrolled spreading of the blaze.

Although the present invention and its advantages have been described in detail, it should be understood that various changes, substitutions, and alterations can be made to the described process and system without departing from the spirit and scope of the invention as defined by the appended claims.

What is claimed is:

1. A fire protection system for walls comprising:
   (a) a plurality of multi-layered flexible protective sheets containing a plurality of layers of heat resistant materials and at least one layer of an intumescent interspersed between two layers of heat resistant material, said protective sheets including:
      a set of protective sheets having a J-fold on a first side, the J-fold formed by the inward folding of a side of the sheets;
      a set of protective sheets having a Z-fold at a bottom end, the Z-fold having a first fold upward and a second fold downward;
      a set of sheets having a top-fold at a top end, the top-fold formed by the downward folding of a top side of the sheets;
   (b) a plurality of mounting bars;
   (c) a plurality of wall anchors for attaching said protective sheets to a wall;
   (d) a plurality of strips of fire protective material;
   (e) a plurality of fasteners for securing adjoining pieces of protective sheets to form a seam; and
   (f) a fire resistant adhesive tape.

2. The fire protective system of claim 1 wherein the protective sheets have from two to five layers of heat resistant materials.

3. The fire protective system of claim 2 containing more than one type of heat resistant material.

4. The fire protective system of claim 1, the heat resistant material being metal foils, fire-resistant fabrics, fiberglass, or a combination of these materials.

5. The fire protective system of claim 1, wherein the intumescent is interspersed between each two adjoining layers of heat resistant materials.

6. The fire protective system of claim 1 wherein the intumescent has an expansion capacity of at least 700%.

7. The fire protective system of claim 1 wherein the mounting bars are steel bars.

8. The fire protective system of claim 1 wherein the wall anchors are metal screws or nails.

9. The fire protective system of claim 1 wherein the fasteners are stainless steel hog-rings.

10. The fire protective system of claim 1 wherein the fire resistant adhesive tape is aluminum or stainless steel tape.

11. A fire protection system for walls comprising:
    (a) a plurality of multi-layered flexible protective sheets containing two to five layers of heat resistant materials separated by layers of an intumescent having an expansion capacity of at least 700%, said protective sheets including:
       a set of protective sheets having a J-fold on a first side, the J-fold formed by the inward folding of a side of the sheets;
       a set of protective sheets having a Z-fold at a bottom end, the Z-fold having a first fold upward and a second fold downward;
       a set of sheets having a top-fold at a top end, the top-fold formed by the downward folding of a top side of the sheets;
    (b) a plurality of steel mounting bars;
    (c) a plurality of metal screws sufficient in length to transverse the mounting bar and the protective sheet;
    (d) a plurality of strips of fire protective material;
    (e) a plurality of stainless steel hog rings; and
    (f) an industrial aluminum or stainless steel tape.

12. A process for installing a fire protection system on vertical walls comprising:
    (a) obtaining a plurality of multi-layered flexible protective sheets containing a plurality of layers of heat resistant materials and having a least one layer of an intumescent between layers of heat resistant materials, said protective sheets including:
       a set of protective sheets having a J-fold on a first side, the J-fold formed by the inward folding of a side of the sheets,
       a set of protective sheets having a Z-fold at a bottom end, the Z-fold having a first fold upward and a second fold downward, and
       a set of sheets having a top-fold at a top end, the top-fold formed by the downward folding of a top side of the sheets,
    (b) installing the protective sheets having the Z-fold along a bottom section of a wall adjoining a floor, the first fold being attached to the wall with a first mounting bar and a first wall anchor, and the second fold secured to the wall with a nail or screw, wherein the second fold covers the first mounting bar and the first wall anchor used to attach the first fold to the wall;
    (c) installing protective sheets vertically up the wall by mounting a pair of protective sheets to the wall with a second mounting bar and a second wall anchor, flipping the top protective sheet over the second mounting bar and the second wall anchor to cover the second mounting bar and the second wall anchor;

(d) installing the protective sheets having the top-fold to a top section of the wall adjoining the ceiling by securing a top area of the top-folded protective sheets to the top section of the wall with a third mounting bar and a third wall anchor, wherein the top-fold is folded over the third mounting bar and the third wall anchor and secured to the surface of the protective sheet with a fire resistant adhesive tape;

(e) connecting adjacent protective sheets having a J-fold, wherein a strip of a fire protective material is secured to the wall under an overlapping area comprising the J-fold of one protective sheet and a section of one side of another protective sheet, the overlapping area being secured together with a plurality of fasteners to form a seam, wherein the seam is folded flat and taped down with a fire resistant adhesive tape; and (f) repeating steps (b) through (e) as needed to cover the surface of the wall.

13. The process of claim 12 wherein the installed fire protection system will protect the wall from temperatures greater than 500° F. for at least 1½ hours.

14. The process of claim 12 wherein the protective sheets contain from 2 to 5 layers of heat resistant material.

15. The process of claim 12 wherein the protective sheets contain intumescent interspersed between the layers of heat resistant material.

16. The process of claim 12 further comprising installing a protective covering over a rectangular penetration of the wall protruding from the wall, said installation includes the steps of:

securing a first end of a strip of a protective sheet over an adjoining end of a first protective sheet that abuts one side of the penetration with a fourth mounting bar and a fourth wall anchor;

folding the strip over the fourth mounting bar and the fourth wall anchor;

securing a second end of the strip, said second end opposed to said first end, by mounting an end of a second protective sheet over the second end of the strip with a fifth mounting bar and a fifth wall anchor; and folding the second protective sheet over the fifth mounting bar and the fifth wall anchor.

17. The process of claim 12 further comprising installing a protective covering around a pipe protruding from the wall, said installation includes the steps of:

preparing a strip of protective sheet for wrapping the pipe, said strip being longer than a circumference of the pipe so that a first and a second side of the protective sheet will overlap when the protective sheet is wrapped around the pipe, wherein a front end of said strip is cut at intervals to form a first series of flares;

wrapping a section of the pipe protruding from the wall with the strip of protective sheet, wherein the flares are placed next to the wall and the first and second sides of the protective sheet overlap;

taping the flares to the wall with a fire resistant adhesive tape;

securing the overlapping sides of the strip of protective sheet with a plurality of fasteners to form a seam;

folding the seam down and taping the seam to the surface of the strip of protective sheet;

precutting a hole in a wall-covering protective sheet, said hole having a radius shorter than the radius of the pipe, and cutting the circumference f the hole at intervals to form a second series of flares;

mount the wall-covering protective sheet over the pipe and tape the second series of flares to the strip of protective sheet;

install a collar over the first and second series of flares, said collar is cut from one protective sheet.

* * * * *